Feb. 2, 1960 P. W. MARTIN ET AL 2,923,824
X-RAY ANALYSIS OF GEOLOGICAL FORMATIONS
Filed Aug. 10, 1953 2 Sheets-Sheet 2
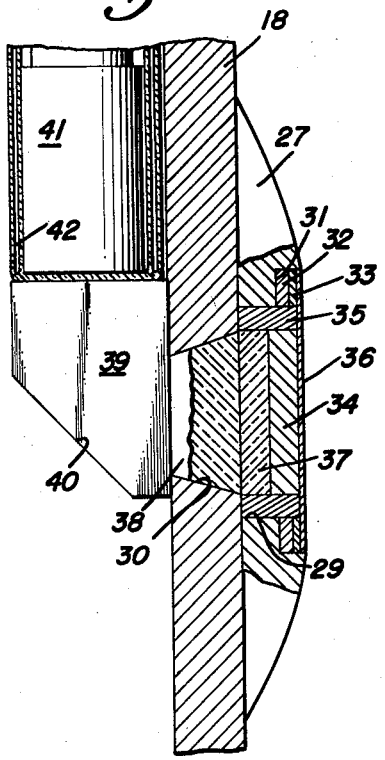
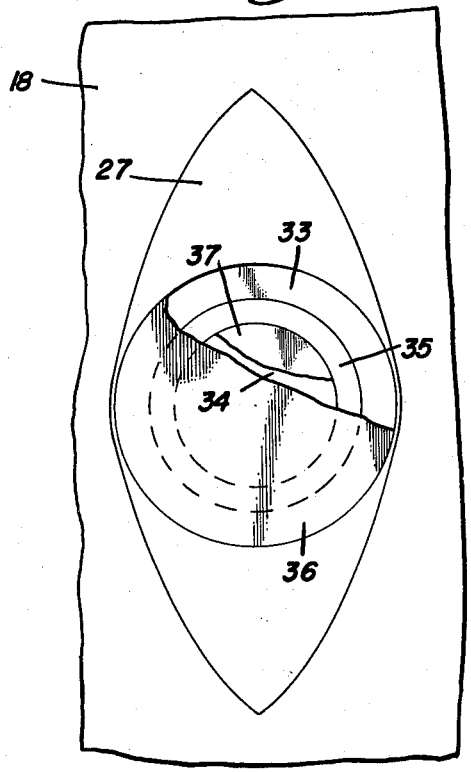
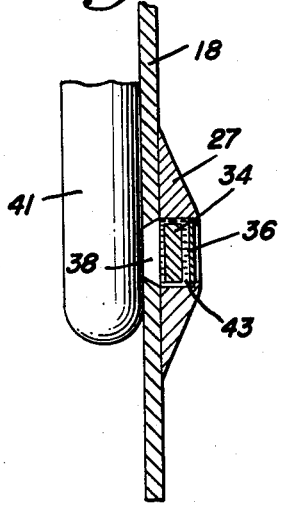
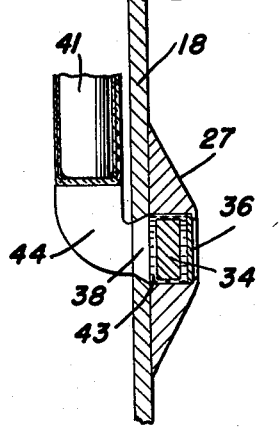
PHILIP W. MARTIN
ROBERT W. PRINGLE
INVENTORS.
BY 
Attorney

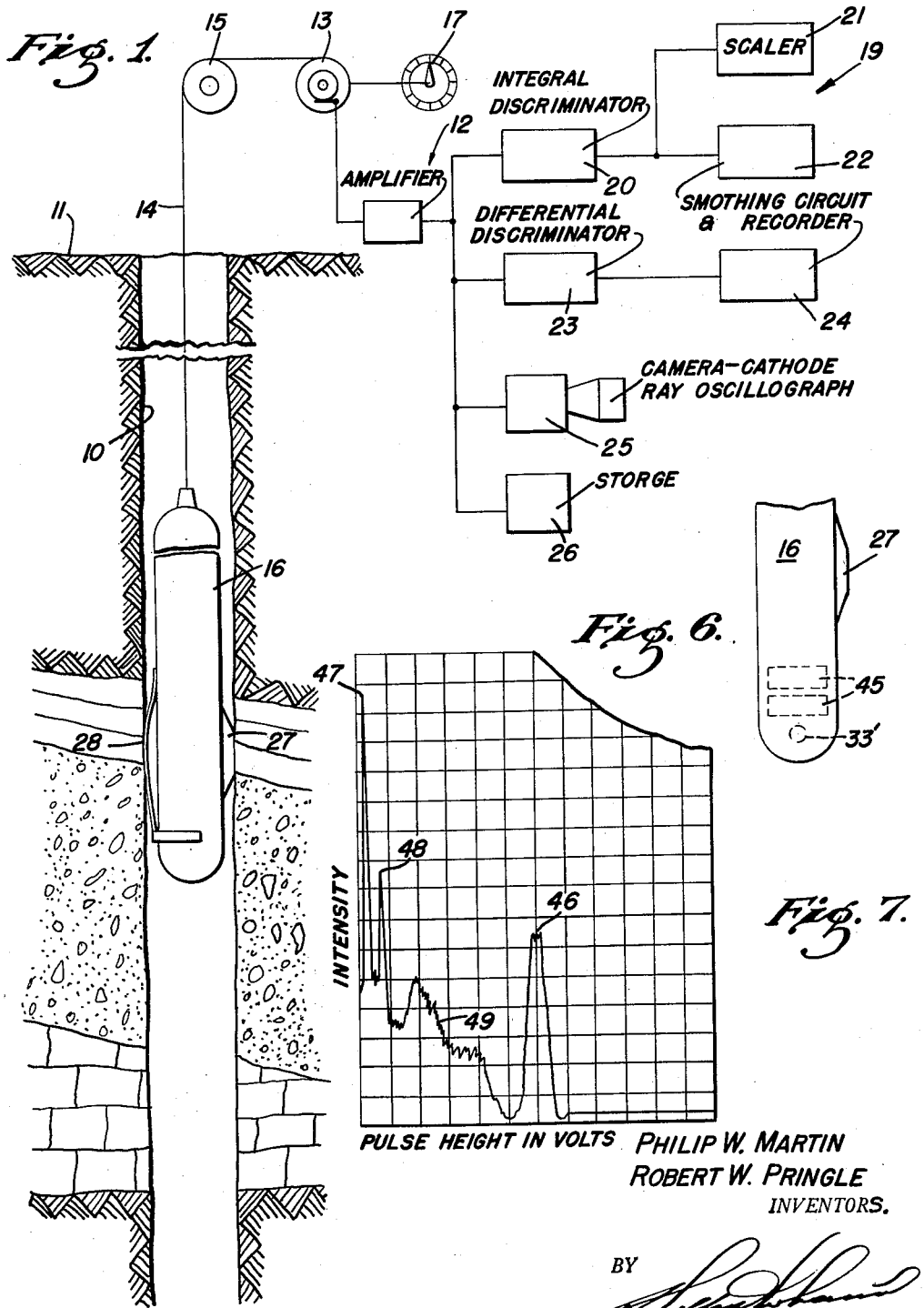

United States Patent Office 2,923,824
Patented Feb. 2, 1960

2,923,824

X-RAY ANALYSIS OF GEOLOGICAL FORMATIONS

Philip W. Martin, Whittier, Calif., and Robert W. Pringle, Winnipeg, Manitoba, Canada Application August 10, 1953, Serial No. 373,252

18 Claims. (Cl. 250—71)

The present invention relates generally to the art of geophysical exploration, and is more particularly concerned with an improved method and apparatus for conducting exploratory investigations of surface and subsurface formations in the vicinity of bore or other types of holes in earth formations for the purpose of determining the nature and characteristics of the formations.

In its broad consideration, the present invention proposes to determine the identity of formation and associated elements by detection and study of secondary radiations known as fluorescence rays, secondary X-rays or K characteristic radiations which may be produced by bombarding the formation with primary radiations such as neutrons, gamma rays or high energy X-rays. It is proposed to provide apparatus by which an analysis of the secondary radiations may be made either simultaneously with the irradiation of the formation by gamma rays or X-rays, or subsequent to the irradiation of the formation by neutrons or high energy gamma rays.

According to one theory, atomic electrons arrange themselves in shells. The innermost shell adjacent to the nucleus is termed the K shell. Electrons in this shell are the most tightly bound and hence require the greatest excitation energy to remove them. Other electrons partly shielded from the nucleus by the K electrons form the L shell; and these electrons are less tightly bound than are the K electrons. Again, other electrons form M shells, N shells, and so on. According to this arrangement, whenever a high-energy electron ejects an electron from the K shell, a gap is left, and an electron from the L shell fills this gap. The energy difference due to this electron transfer from L to K shells appears as a radiation of the K X-ray series of lines. It has thus been found experimentally, that a definite minimum amount of energy is required for each atom to produce the K series X-ray lines and that the greater the atomic number the greater the energy. Thus, X-ray spectra provide a means for identifying the structure of the atoms of the various elements and a key to the element from which the secondary radiation emanates.

The fluorescence radiations emitted from all the elements have the same general characteristics, and differ only by regular gradations in penetrating power or wavelength as one progresses from one element to another. In other words, as the atomic number increases, the binding energy of the electrons increases and the secondary X-rays produced increase in energy. A workable tool is provided in the present invention by which the elements in the wall of the bore hole may be identified by analyzing the X-ray energy pulse heights.

In the present invention, it is possible to make use of the relatively low penetrating power of the low energy secondary radiations, by utilizing apparatus wherein the source of primary radiations is substantially in direct contact with the bore wall, and likewise the detector means is positioned substantially in direct contact with the radiating material, thus making it possible to utilize the secondary radiations as a medium for determining the elements in the bore wall.

With the foregoing in mind, it is one object to provide an improved method and apparatus for determining the nature and characteristics of geological formations by detecting secondary emissions from the formation, for example, secondary X-rays.

A further object is to provide a method and apparatus capable of bombarding the formation with a primary radiation, and for detecting the presence of secondary X-rays set up in the material of the formation; which is capable of detecting very soft X-rays; and which will enable study of the spectra of X-rays.

A still further object is to provide an improved method and apparatus which is devoid of screening materials which would prevent detecting of the secondary radiations from bombarded materials of the formation being considered.

It is also an object to provide a method and apparatus which may be utilized for promptly and immediately detecting the secondary radiations.

It is also an object to provide novel mounting for the detecting means, wherein hydrostatic pressure as experienced in deep bores will be equalized with respect to a scintillating crystal, adapted to scintillate under the effect of secondary radiations, and whereby damage to the crystal due to high pressures will be avoided.

Still another object is to provide apparatus which incorporates improved means for conducting light radiations from means adapted to scintillate under the effect of secondary radiations to scintillation detecting means.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a view generally illustrating apparatus embodying the present invention, and by means of which the herein described method may be practiced;

Fig. 2 is an enlarged view in section, showing the manner in which the various cooperatively associated elements are mounted with reference to the wall structure of the exploration unit of the device;

Fig. 3 is a face view of the primary radiation transmitter and secondary radiation receiver of the exploration unit, as viewed along the line 3—3 in Fig. 2;

Fig. 4 is a sectional view similar to Fig. 2, but incorporating a modification in the light path conducting means;

Fig. 5 is a similar view showing another modified arrangement of light conducting means;

Fig. 6 is a fragmentary view illustrating an alternative location for the primary radiation sources; and Fig. 7 is a view illustrating a characteristic record, such as obtained with the present invention.

Referring now to the drawings, Fig. 1 represents a typical well bore structure 10 which passes from the ground surface 11 downwardly through a plurality of different formation structures which have been distinguished in the drawing by means of various types of shading.

At the ground surface, there is illustrated a surface station as generally indicated by the numeral 12, and which includes suitable hoisting equipment which may comprise, for example, a hoisting drum 13 from which a hoisting cable conductor 14 is trained over a guide pulley 15 and connected to an exploration unit within the well bore, as generally indicated by the numeral 16.

As shown, the hoisting drum is provided with suitable indicating mechanism, which may comprise a rotating pointer 17 associated with a graduated dial, or other suitable means for indicating the amount of cable which has been wound and unwound thereon, or in other words the position of the exploration unit within the well bore. With the equipment briefly described above, the exploration unit may be readily controlled and moved within the well bore in carrying out the logging operation and the method of the present invention. It will, of course, be appreciated that when strip type recorders are utilized their linear travel will be coordinated with cable travel.

It will be appreciated that the exploration unit may assume various forms of construction. For purposes of illustration, the exploration unit is shown herein as comprising an elongate tubular housing defined by a wall envelope structure 18 arranged to carry detecting equipment of the general character of that explained in our copending application, Serial No. 241,334, filed August 10, 1951, now U.S. Patent 2,686,268. The detecting equipment is connected by suitable circuits and conductors in the hoisting cable conductor 14 with suitable detecting devices and equipment positioned at the surface, and as generally indicated by the numeral 19. The specific devices will be discussed subsequently.

Considered in its general aspects, the present invention proposes to utilize a radium source or other suitable source of primary radiations such as gamma or strong X-rays which are arranged to bombard the wall of the well bore. The primary radiations act to induce secondary radiations in the substance of the formation, such as K series radiations, and X-ray radiations or fluorescence X-rays, and which are detected by scintillation crystal means such as cesium bromide, sodium iodide, calcium tungstate, or by one of the liquid or plastic scintillators. Light from the scintillations is then conducted to suitable devices where an effect of such scintillations is multiplied and through suitable electronic circuits carried to suitable recording, storage, and analyzing devices by which the elements or substances in the wall formation of the well bore in which the secondary radiations originate may be identified.

As exemplary of such devices, Fig. 1 illustrates the use of an integral discriminator 20 with an associated scaler 21 and smoothing circuit and recorder 22. A differential discriminator 23 or other suitable energy pulse height indicating devices and smoothing circuit and recorder 24 may be utilized in analyzing the induced secondary radiations. A camera-cathode ray oscillograph 25 may be used also, as well as various types of information storage devices, as generally indicated at 26, and which may include magnetostatic devices, electrostatic devices, and the like.

In order to overcome the difficulties due to relatively low penetration of X-rays through thicknesses of various absorbing materials which are encountered in the usual situation, it is proposed to utilize an arrangement wherein the crystal means is mounted on the outside of the exploration unit wall envelope 18 so that the crystal means may be brought into as close proximity to the well bore wall as possible.

More specifically, as shown in Fig. 2, an elongate wall portion 27 is secured over the outer surface of the wall envelope 18. The wall portion 27 is narrowed towards its ends and made of decreasing thickness so as to form in effect a plow which will scrape along the wall of the well bore during movements of the exploration unit, and when held in contact by means of a spring 28 will position the scintillation crystal means as close to the wall of the well bore as possible.

The wall portion 27 is provided intermediate its ends with an opening 29 which is in axial alignment with a tapered opening 30 in the wall envelope 18. An annular recess 31 surrounds the outer end of the opening 29 and provides a seat for a lead shielding ring 32 positioned back of a ring 33 of active material which constitutes a source of primary radiations. Scintillating crystal means 34 is mounted within the opening 29, the crystal means being shielded from direct radiations from the active material by means of an annular liner in the opening 29 of lead or other suitable shielding material, as indicated at 35.

The scintillation crystal means may have disposed over its outer surface a thin sheet or membrane 36 of aluminum, titanium, or other suitable material which will form a window substantially transparent to X-rays. A hydrocarbon membrane such as rubber may be used also, this material having excellent transparency and wearing qualities. Moreover, where calcium tungstate is used as the crystal, the protecting membrane may be eliminated as such material is sufficiently wear resistant to permit direct contact with the bore wall.

From the scintillation crystal means 34, a light path is formed for conducting light from scintillations in the crystal means through the wall of the exploration unit. This may be accomplished by the provision of a disc 37 of suitable material such as quartz glass, which is mounted in the opening 29 and associated with a tapered plug 38, which may be separately formed or integral with disc 37, of similar or other suitable material mounted in the tapered opening 30 of the wall envelope 18. The inner end of the plug 38 is associated with a prism 39 having a reflecting surface 40 by which light is directed interiorly of the exploration unit to a photo-multiplier tube 41 or other suitable means by which an effect of the crystal scintillations may be multiplied. In this case, of course, the photo-multiplier tube will be mounted and insulated against temperature changes and moisture by utilizing a surrounding vacuum bottle, or other suitable means 42 after the manner described in our above mentioned copending application.

As a protective feature, the outer surface of the wall portion 27 may be covered with a chrome layer.

When crystal scintillators instead of liquid scintillators are utilized, there is a possibility of the crystals being fractured by local stresses applied to them under operating conditions in deep well bores. However, it has been determined that as long as pressures are equally applied on all sides of the crystal, extremely high pressures may be applied to the crystal without danger of fracture. In the device of the present invention, provision has therefore been made to balance the hydrostatic fluid pressures of the well. For such purpose, the opening 30, as shown in Fig. 4, is made of such size as to form a cavity within which the crystal 34 may be mounted. This cavity is made of larger size than the crystal and is used as a reservoir in which a fluid 43, such as silicon, surrounds the crystal and serves as a pressure equalizing medium. With this arrangement, extremely high pressures may be applied to the crystal without danger of fracture.

As a modified construction to that disclosed in Fig. 2, a photo-multiplier tube having a side window, as shown in Fig. 4, rather than an end window may be utilized.

As a still further modification, instead of utilizing a prism 39, as shown in Fig. 1, the arrangement may utilize a "light pipe" of plastic material for guidingly determining the light path from the crystal 34 to the photo-multiplier tube 41, as shown in Fig. 5. The light pipe is here indicated by the numeral 44.

In the above described constructions, it is contemplated that the primary radiation source should be located adjacent or close to the outer surface of the exploration unit wall envelope. However, it is within the scope of the present invention to utilize a radiation source which may be located within the exploration unit envelope wall. Such an arrangement is shown in Fig. 6, wherein the source is shown at 33' and is shielded against the direct passage of radiations to the scintillation crystal means by a suitable shielding medium 45. The source 33' would be in such an arrangement necessarily of sufficiently high energy to enable radiations to pass through the material of the envelope wall of the exploration unit.

As shown in Fig. 7, a typical record is illustrated, which is obtainable for pulse height analysis so as to measure the energy of the secondary X-rays and thus enable an identification of the materials of the bore wall formation.

The record curve of Fig. 7 is for Cs 137, the pulse height voltage being plotted against intensity. The peak 46 is the photo line for cesium resulting from gamma rays which may be utilized as a standard for calibrating the pulse height graduations. The presence of the element cesium is then identified by determining the energy of the X-ray peak 47 which is found to correspond with that of cesium. Similarly, the X-ray peak 48 is found to indicate the presence of lead. The jagged irregular portion of the curve as indicated at 49 is due to the Compton effect.

It will be appreciated that while in the present application, the invention has been confined more or less to X-ray analysis, such analysis may be coordinated and utilized with other types of surveys which may be conducted simultaneously or subsequently to the X-ray survey.

The method and apparatus as described herein have been successfully utilized with gratifying results. It is appreciated that various modifications may suggest themselves to those skilled in the art without departing from the spirit of the present invention, and hence, we do not wish to be restricted to the specific form or forms shown or uses mentioned, except to the extent indicated in the appended claims.

We claim:

1. A method for determining the nature and character of a geophysical formation, which comprises the steps of: bombarding the material of the formation with a primary radiation; and detecting and measuring the spectral distribution of energy of secondary radiations induced in said material.

2. A method for determining the nature and character of a geophysical formation, which comprises the steps of: bombarding the material of the formation with a primary radiation; and promptly detecting and analyzing the spectral distribution of energy of secondary radiations induced in said material.

3. A method for determining the nature and character of a geophysical formation, which comprises the steps of: bombarding the material of the formation with a primary radiation; and detecting and measuring the spectral distribution of energy of secondary X-ray radiations from said material.

4. A method for determining the nature and character of a geophysical formation, which comprises the steps of: bombarding the material of the formation with a primary radiation; and detecting and measuring the spectral distribution of energy of secondary radiations from said material including very soft X-rays.

5. The method of prospecting for substances confronting a well bore by their property of emitting secondary radiations upon being exposed to primary radiations, comprising the steps of: moving a source of primary radiations into the well bore into close proximity to said substance; and detecting and measuring the spectral distribution of energy of secondary emissions from said substance.

6. The method of prospecting for substances confronting a well bore by their property of emitting secondary radiations upon being exposed to primary radiations, comprising the steps of: moving a source of primary radiations into the well bore into close proximity to said substance; and detecting and measuring the spectral distribution of energy of secondary X-ray radiations from said substance.

7. In apparatus for investigating formations confronting a well bore wherein the ability of different formations to emit secondary radiations after being exposed to primary radiations is determined to distinguish the formations from each other: an exploration unit adapted to be raised and lowered in the well bore; a source of primary radiations carried by said unit; means for maintaining said source in close proximity to the wall of said bore; and means for detecting and measuring the spectral distribution of energy of radiations emitted from the bore wall formation.

8. In apparatus for investigating formations confronting a well bore wherein the ability of different formations to emit secondary radiations after being exposed to primary radiations is determined to distinguish the formations from each other; an exploration unit including a tubular housing having an outer wall; a source of primary radiations carried by said unit, said source being positioned exteriorly of said wall; means for pressing said source towards the wall of said bore into close proximity to the formations thereof; and means within said housing wall for measuring the spectral distribution of energy of secondary radiations emitted from the bore wall formation.

9. Geophysical exploration apparatus, comprising: a housing having an outer wall; a second wall portion superimposed on the outer surface of said housing wall, said walls having aligned openings therein; a source of primary radiations carried by said housing and positioned adjacent the opening therein; means positioned in the opening of said second wall adapted to scintillate in response to secondary radiations emitted by an adjacent substance bombarded by radiations from said primary source; means shielding said primary source with respect to said scintillating means; and means in said housing for detecting said scintillations, and means sensitive to said scintillations for indicating the spectral distribution of energy of said secondary radiations.

10. Geophysical exploration apparatus, comprising: a housing having an outer wall; a second wall portion superimposed on the outer surface of said housing wall, said walls having aligned openings therein; a source of primary radiations carried by said housing; means positioned in the opening of said second wall adapted to scintillate in response to secondary radiations emitted by an adjacent substance bombarded by radiations from said primary source; means shielding said primary source with respect to said scintillating means; means in said housing for detecting said scintillations; and means defining a light flow path between said scintillating means and said detecting means, and means sensitive to said scintillations for indicating the spectral distribution of energy of said secondary radiations.

11. Geophysical exploration apparatus, comprising: a housing having an outer wall; a second wall portion superimposed on the outer surface of said housing wall, said walls having aligned openings therein; a source of primary radiations carried by said housing; means positioned in the opening of said second wall adapted to scintillate in response to secondary radiations emitted by an adjacent substance bombarded by radiations from said primary source; means shielding said primary source with respect to said scintillating means; means in said housing for detecting said scintillations; and a light conductor for guiding the light rays from said scintillating means to said detecting means, and means sensitive to said scintillations for indicating the spectral distribution of energy of said secondary radiations.

12. Geophysical exploration apparatus, comprising: a housing having an outer wall; a second wall portion superimposed on the outer surface of said housing wall, said walls having aligned openings therein; a source of primary radiations carried by said housing; means positioned in the opening of said second wall adapted to scintillate in response to secondary radiations emitted by an adjacent substance bombarded by radiations from said primary source; means shielding said primary source with respect to said scintillating means; means in said housing for detecting said scintillations; and prism means for directing the light rays from said scintillation means to said detecting means, and means sensitive to said scintillations for indicating the spectral distribution of energy of said secondary radiations.

13. Geophysical exploration apparatus, comprising: a housing having an outer wall; a second wall portion superimposed on the outer surface of said housing wall, said walls having aligned openings therein; a source of primary radiations carried by said housing; means defining a cavity in the opening of said second wall; crystal means in said cavity adapted to scintillate in response to secondary radiations emitted by an adjacent substance bombarded by radiations from said primary source; means shielding said crystal means from direct radiations from said primary source; a liquid surrounding said crystal whereby hydrostatic pressures are equally distributed with respect to said crystal means; and means within said housing for detecting said scintillations.

14. Geophysical exploration apparatus, comprising: a housing having an outer wall; a second wall portion superimposed on the outer surface of said housing wall, said walls having aligned openings therein; a source of primary radiations surrounding the opening in said second wall; means positioned in the opening of said second wall adapted to scintillate in response to secondary radiations emitted by an adjacent substance bombarded by radiations from said primary source; means shielding said primary source with respect to said scintillating means; and means in said housing for detecting said scintillations, and means sensitive to said scintillations for indicating the spectral distribution of said secondary radiations.

15. Geophysical exploration apparatus, comprising: a housing including an envelope wall structure having an opening extending between outer and inner surfaces thereof; a source of primary radiations adjacent the outer end of said opening; means positioned in said opening adjacent its outer end, adapted to scintillate in response to secondary radiations emitted by an adjacent substance bombarded by radiation from said primary source; means shielding said primary source with respect to said scintillating means; and means in said housing for detecting said scintillations through said opening, and means sensitive to said scintillations for indicating the spectral distribution of said secondary radiations.

16. Geophysical exploration apparatus, comprising: a housing including an envelope wall structure having an opening extending between outer and inner surfaces thereof; a primary source of high energy X-rays carried by said housing; means positioned in said opening adjacent its outer end, adapted to scintillate in response to secondary X-ray radiations emitted by an adjacent substance bombarded by radiations from said primary source; means shielding said primary source with respect to said scintillating means; and means in said housing for detecting said scintillations through said opening, and means sensitive to said scintillations for indicating the spectral distribution of energy of said secondary X-ray radiations.

17. Geophysical exploration apparatus, comprising: a housing including an envelope wall structure having an opening extending between outer and inner surfaces thereof; a primary source of high energy X-rays carried by said housing; means positioned in said opening adjacent its outer end, adapted to scintillate in response to secondary X-ray radiations emitted by an adjacent substance bombarded by radiations from said primary source; means shielding said primary source with respect to said scintillating means; means in said housing for detecting said scintillations through said opening; and measuring means having an electrical connection with said detecting means by which the spectral distribution of energy of said secondary X-rays may be determined.

18. Geophysical exploration apparatus, comprising: a housing including an envelope wall structure having an opening extending between outer and inner surfaces thereof; a primary source of high energy X-rays carried by said housing; means positioned in said opening adjacent its outer end, adapted to scintillate in response to secondary X-ray radiations emitted by an adjacent substance bombarded by radiations from said primary source; means shielding said primary source with respect to said scintillating means; means in said housing for detecting said scintillations through said opening; and remotely located measuring means having an electrical connection with said detecting means by which spectral distribution of energy of said secondary X-rays may be determined.

References Cited in the file of this patent

UNITED STATES PATENTS

| | | |
|---|---|---|
| 2,469,461 | Russell | May 10, 1949 |
| 2,636,994 | Neufeld | Apr. 28, 1953 |
| 2,648,012 | Scherbatskoy | Aug. 4, 1953 |
| 2,659,011 | Youmans et al. | Nov. 10, 1953 |
| 2,711,482 | Goodman | June 21, 1955 |
| 2,778,947 | Scherbatskoy | Jan. 22, 1957 |
| 2,782,318 | Herzog | Feb. 19, 1957 |